(12) United States Patent
Yang et al.

(10) Patent No.: US 12,319,871 B2
(45) Date of Patent: Jun. 3, 2025

(54) APPLICATION OF NAPHTHENIC IMIDAZOLINE IN INHIBITING FORMATION OF NATURAL GAS HYDRATES AND COMPOSITION CONTAINING SAME

(71) Applicants: CHINA PETROLEUM & CHEMICAL CORPORATION, Beijing (CN); SINOPEC EXPLORATION & PRODUCTION RESEARCH INSTITUTE, Beijing (CN)

(72) Inventors: Lihong Yang, Beijing (CN); Jiayuan He, Beijing (CN); Haibo Wang, Beijing (CN); Shengyou Zhou, Beijing (CN); Xin Huang, Beijing (CN); Kefeng Yang, Beijing (CN); Shibo Hao, Beijing (CN); Le Zhang, Beijing (CN); Xueqi Cen, Beijing (CN); Guoxing Chai, Beijing (CN)

(73) Assignees: CHINA PETROLEUM & CHEMICAL CORPORATION, Beijing (CN); SINOPEC EXPLORATION & PRODUCTION RESEARCH INSTITUTE, Beijing (CN)

( * ) Notice: Subject to any disclaimer, the term of this patent is extended or adjusted under 35 U.S.C. 154(b) by 0 days.

(21) Appl. No.: 18/554,210

(22) PCT Filed: Sep. 29, 2021

(86) PCT No.: PCT/CN2021/121829
§ 371 (c)(1),
(2) Date: Oct. 6, 2023

(87) PCT Pub. No.: WO2023/279554
PCT Pub. Date: Jan. 12, 2023

(65) Prior Publication Data
US 2024/0376369 A1    Nov. 14, 2024

(30) Foreign Application Priority Data
Jul. 8, 2021   (CN) .......................... 202110774301.X

(51) Int. Cl.
*E21B 37/06* (2006.01)
*C09K 8/524* (2006.01)
*E21B 41/00* (2006.01)

(52) U.S. Cl.
CPC .............. *C09K 8/524* (2013.01); *E21B 37/06* (2013.01); *E21B 41/0099* (2020.05); *C09K 2208/22* (2013.01)

(58) Field of Classification Search
None
See application file for complete search history.

(56) References Cited

U.S. PATENT DOCUMENTS

| 3,705,027 A  | * | 12/1972 | Adams ................. A61Q 17/005 |
|---|---|---|---|
|   |   |   | 210/764 |
| 2017/0247798 A1 | * | 8/2017 | Moloney ............... C23F 11/145 |

FOREIGN PATENT DOCUMENTS

| CN | 1496982 A    | 5/2004  |
|----|--------------|---------|
| CN | 101319105 A  | 12/2008 |
| CN | 102504786 A  | 6/2012  |
| CN | 102653696 A  | 9/2012  |
| CN | 103641248 A  | 3/2014  |
| CN | 104479586 A  | 4/2015  |
| CN | 104818962 A  | 8/2015  |
| CN | 106745836 A  | 5/2017  |
| CN | 112341393 A  | 2/2021  |
| GB | 1332959 A    | 10/1973 |
| GB | 2064985 A    | 6/1981  |
| RU | 2732900 C1   | 9/2020  |
| RU | 2751893 C1   | 7/2021  |
| WO | 2021262981 A1 | 12/2021 |

OTHER PUBLICATIONS

Machine translation of CN101319105A; Espacenet. (Year: 2008).*

* cited by examiner

*Primary Examiner* — Andrew Sue-Ako
(74) *Attorney, Agent, or Firm* — NKL Law; Allen Xue

(57) ABSTRACT

Naphthenic imidazoline can be used in inhibiting formation of natural gas hydrate. A composition contains the naphthenic imidazoline and modified polysaccharide. The modified polysaccharide may be cationic amylose.

11 Claims, No Drawings

APPLICATION OF NAPHTHENIC IMIDAZOLINE IN INHIBITING FORMATION OF NATURAL GAS HYDRATES AND COMPOSITION CONTAINING SAME

TECHNICAL FIELD

The present invention relates to use of naphthenic imidazoline in inhibiting formation of natural gas hydrate, and specifically to a composition containing the same.

TECHNICAL BACKGROUND

The mechanism of action of existing natural gas hydrate inhibitors focuses on the inhibition of hydrate nucleation and crystal growth and coalescence in the fluid phase in pipeline transmission. However, in the actual production and exploitation procedure, the effect on inhibiting the nucleation of natural gas hydrate is unsatisfactory.

Moreover, due to environmental protection, economic cost and thermodynamic inhibition, it has been a trend to use low-dose natural gas hydrate inhibitors (LDHI kinetic inhibitors) instead of thermodynamic inhibitors to prevent hydrate formation and particle coalescence. However, the existing LDHIs cannot meet the requirements of marine environmental protection.

Therefore, there is an urgent need for an efficient and green natural gas hydrate inhibitor which can achieve prominent flow assurance during development and exploitation.

SUMMARY OF THE INVENTION

A first aspect of the present invention provides use of naphthenic imidazoline in inhibiting formation of natural gas hydrate.

In one specific embodiment, naphthenic imidazoline has a structure as shown in formula (I):

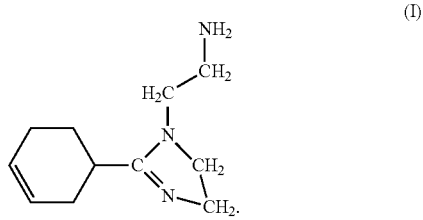 [SMILES: NCCN1CCN=C1C1CC=CCC1]

In one specific embodiment, the natural gas hydrate is methane hydrate.

A second aspect of the present invention provides a composition comprising modified polysaccharide and naphthenic imidazoline defined in the use as provided in the first aspect of the present invention.

In one specific embodiment, the modified polysaccharide has a structure shown in formula (II), wherein n is from 150 to 400:

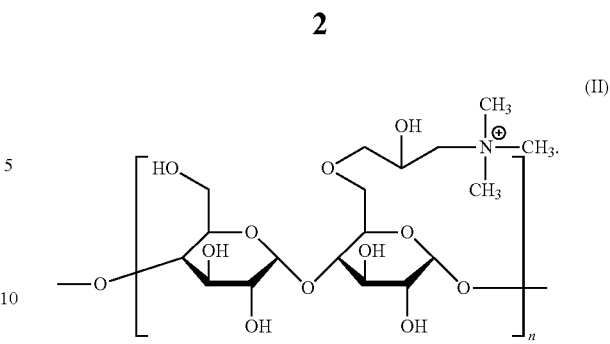

In one specific embodiment, a mass ratio of naphthenic imidazoline to modified polysaccharide is above 1:1.

In one specific embodiment, the mass ratio of naphthenic imidazoline to modified polysaccharide is from 1:1 to 3:1.

In one specific embodiment, the composition further comprises water.

In one specific embodiment, a total mass percentage of naphthenic imidazoline and modified polysaccharide is above 0.5%, measured as 100% by a total mass of the composition.

In one specific embodiment, the total mass percentage of naphthenic imidazoline and modified polysaccharide is from 0.5% to 1.5%, measured as 100% by the total mass of the composition.

In one specific embodiment, the modified polysaccharide is obtained by modification of amylose in the presence of cationic reagent.

In one specific embodiment, the cationic reagent is epoxy propyl trimethyl ammonium chloride.

In one specific embodiment, a mass ratio of the amylose to the cationic reagent is 1:(1–2), for example, 1:2.

A third aspect of the present invention provides use of the composition as provided in the second aspect of the present invention in inhibiting formation of natural gas hydrate.

In one specific embodiment, the natural gas hydrate is methane hydrate.

The Advantageous Effects of the Present Invention

The present invention discloses for the first time that naphthenic imidazoline is able to inhibit the formation of natural gas hydrate, and also generate adsorption at the liquid-solid interface, which results in a reduction of positions for nucleation of natural gas hydrate at the liquid-solid interface, thereby increasing the difficulty of natural gas hydrate formation. In addition, the synergistic effect of a combination of naphthenic imidazoline and modified polysaccharide can enhance the effect of inhibiting the formation of natural gas hydrate in the production and exploitation procedures (e.g., in the wellbore environment), and has a better effect on the long term gas-producing wellbore, which solves the problems in the existing flow assurance technology for exploitation of natural gas hydrate. Furthermore, cationic amylose is a preferable biodegradable material, which is environment-friendly and able to meet the requirements of marine environmental protection.

DETAILED DESCRIPTION OF EMBODIMENTS

The present invention will be further described below with reference to the embodiments. However, the embodiments are only exemplary of the present invention, which do not constitute any limitations to the present invention in any circumstances.

Preparation of Cationic Amylose

1. Preparation of cationic reagent (GTA). 315 ml (4.0 mol) of epichlorohydrin was added to a 500 ml three-necked flask, and cooled to 0° C. in an ice bath. Then, 47.2 g (0.8 mol) of trimethylamine was added slowly over a period of 2 h at 0° C. The mixture obtained was stirred for 5 h at room temperature, filtered, washed with acetone for three times, and vacuum dried to obtain 116 g of a white solid, which was epoxy propyl trimethyl ammonium chloride.
2. Preparation of cationic amylose. The cationic reagent, i.e., epoxy propyl trimethyl ammonium chloride (GTA), and amylose with n ranging from 150 to 400 were placed in a reaction vessel, the mass ratio of cationic reagent to amylose being (1–2):1. Subsequently, sodium hydroxide and 200 ml of distilled water were added to the reaction vessel under nitrogen atmosphere, with a pH value of 10. Then, the mixture obtained was stirred for reaction for 6 to 8 h at a temperature ranging from 50° C. to 60° C. to obtain a reaction product, which was washed with ethanol solution for three times, filtered until the filtrate contained no chloride ions, and vacuum dried to obtain the cationic amylose with n ranging from 150 to 400. The structural formula of the cationic amylose is shown below.

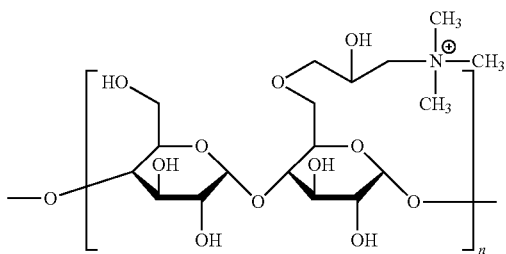

Example 1

An evaluation method for tetrahydrofuran (THF) natural gas hydrate inhibitor was used to evaluate the effect of naphthenic imidazoline on the inhibition of natural gas hydrate formation.

40 g of deionized water was added to a 100 mL round bottom flask, and naphthenic imidazoline was added and stirred to fully dissolve. In this manner, aqueous solutions were prepared with mass percentages of 0.5%, 1.0% and 1.5%, respectively. The structural formula of naphthenic imidazoline is shown below.

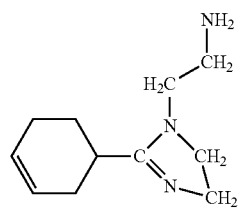 [SMILES: NCCN1CCN=C1C1CC=CCC1]

10 mL of the above prepared naphthenic imidazoline aqueous solutions of three concentrations were accurately pipetted into three round-bottomed flasks, respectively, and 2.65 mL of THF was added in each flask. Each naphthenic imidazoline aqueous solution was mixed uniformly with THF under stirring to obtain the THF-inhibitor solution. The THF-inhibitor solution was placed into an incubator kept at a constant temperature of 4° C. for 15 min. Then, the THF-inhibitor solution was placed in a reaction bath at 0° C. The reading of the thermometer was observed. When the THF-inhibitor solution reached 0° C., the state of the THF-inhibitor solution was observed, and timing was started. When THF hydrate was formed (i.e., the solution became turbid and flocculated white crystals appeared), timing was terminated. The time used is THF hydrate induction time.

The results were shown in Table 1.

TABLE 1

| | Inhibitor (wt/%) | | | |
|---|---|---|---|---|
| | 0 | 0.5 | 1.0 | 1.5 |
| THF hydrate induction period (min) | 2 | 51 | 109 | 118 |

According to the induction period in Table 1, it can be seen that the inhibiting effect of naphthenic imidazoline on THF hydrate increased with the increase of mass concentration thereof, but the increment was gradually reduced. Therefore, the concentration of naphthenic imidazoline can be controlled below 1.5%, or even below 1%.

Example 2

A visual high-pressure experimental device was used to evaluate the inhibiting effect of naphthenic imidazoline on natural gas hydrate formation.

The experimental device mainly included a thermostatic water bath, a reactor, a magnetic agitator, a data acquisition module, a temperature sensor and a pressure sensor. The volume of the reactor was 1000 mL, and the maximum pressure it can withstand was 25 MPa. The precision of the temperature sensor was ±0.1° C., and the precision of the pressure sensor was ±0.025 MPa. The reaction gas was methane gas with a purity of 99.9%.

200 g of naphthenic imidazoline aqueous solutions with mass percentages of 0%, 0.5%, 1.0% and 1.5% were prepared, respectively, and added to the high-pressure reactor. The reactor was filled with reaction gas (i.e., methane gas) through turning on an inlet valve and an exhaust valve thereof at the same time, so that the pressure at an inlet of the reactor was 0.5 MPa for 3 min. The temperature of the water bath was lowered to cool the reactor. When the temperature of the reactor reached a predetermined temperature of 4° C., the exhaust valve of the reactor was cut off, and the reaction gas was still introduced into the reactor. When the air pressure in the reactor reached 6 MPa, the inlet valve of the reactor was cut off, and the magnetic agitator was activated, with the pressure and temperature data being recorded. Whether the methane hydrate crystals appeared was observed through a viewing window of the reactor, and the experiment was terminated when the pressure decreased and stabilized at a certain stable value for a long time. The induction time of gas hydrate is the time when hydrate crystal was formed and observed through the viewing window. The results were shown in Table 2.

TABLE 2

|  | Naphthenic imidazoline (wt/%) | | | |
| --- | --- | --- | --- | --- |
|  | 0 | 0.5 | 1.0 | 1.5 |
| Methane hydrate induction period (min) | 146 | 218 | 324 | 349 |

According to the induction period in Table 2, it can be seen that the inhibiting effect of naphthenic imidazoline on methane hydrate increased with the increase of mass concentration thereof, but the increment was gradually reduced. Therefore, the concentration of naphthenic imidazoline can be controlled below 1.5%, or even below 1%, which was consistent with the results in Example 1.

Example 3

The cationic amylose with n ranging from 150 to 400 prepared as described above was used as the natural gas hydrate inhibitor, and the effectiveness thereof in inhibiting the formation of natural gas hydrate was evaluated using the THF method.

Aqueous solutions of the natural gas hydrate inhibitor with respective mass percentages of 0.5%, 1.0% and 1.5% were prepared using deionized water.

Other steps were the same as in Example 1.

The results were shown in Table 3.

TABLE 3

|  | Inhibitor (wt/%) | | | |
| --- | --- | --- | --- | --- |
|  | 0 | 0.5 | 1.0 | 1.5 |
| THF hydrate induction period (min) | 2 | 43 | 117 | 138 |

Example 4

A mixture of naphthenic imidazoline and the cationic amylose prepared as described above was used as the natural gas hydrate inhibitor, and the effectiveness thereof in inhibiting the formation of natural gas hydrate was evaluated using the THF method.

Deionized water was used to prepare an aqueous solution, wherein a total mass percentage of naphthenic imidazoline and cationic amylose was 0.5%, and the mass ratios of naphthenic imidazoline to the cationic amylose with n ranging from 150 to 400 were 3:0, 3:1, 2:1, 1:1, 0:1, respectively.

Other steps were the same as in Example 1.

The results were shown in Table 4.

TABLE 4

|  | Mass ratio | | | | |
| --- | --- | --- | --- | --- | --- |
|  | 3:0 | 3:1 | 2:1 | 1:1 | 0:1 |
| THF hydrate induction period (min) | 118 | 142 | 120 | 95 | 43 |

Example 5

A visual high-pressure experimental device was used to evaluate the inhibiting effect of a composition of naphthenic imidazoline and cationic amylose on natural gas hydrate formation.

The experimental device mainly included a thermostatic water bath, a reactor, a magnetic agitator, a data acquisition module, a temperature sensor and a pressure sensor. The volume of the reactor was 1000 mL, and the maximum pressure it can withstand was 25 MPa. The precision of the temperature sensor was ±0.1° C., and the precision of the pressure sensor was ±0.025 MPa. The reaction gas was methane gas with a purity of 99.9%.

200 g of aqueous solutions were prepared, wherein the mass ratio of naphthenic imidazoline and cationic amylose with n ranging from 150 to 400 was 2:1, and total mass percentages of naphthenic imidazoline and cationic amylose were 0%, 0.5%, 1.0% and 1.5%, respectively. Then the solutions were added to the high-pressure reactor. The reactor was filled with reaction gas (i.e., methane gas) through turning on an inlet valve and an exhaust valve thereof at the same time, so that the pressure at an inlet of the reactor was 0.5 MPa for 3 min. The temperature of the water bath was lowered to cool the reactor. When the temperature of the reactor reached a predetermined temperature of 4° C., the exhaust valve of the reactor was cut off, and the reaction gas was still introduced into the reactor. When the air pressure in the reactor reached 6 MPa, the inlet valve of the reactor was cut off, and the magnetic agitator was activated, with the pressure and temperature data being recorded. Whether the methane hydrate crystals appeared was observed through a viewing window of the reactor, and the experiment was terminated when the pressure decreased and stabilized at a certain stable value for a long time. The induction time of natural gas hydrate is the time when hydrate crystal was formed and observed through the viewing window. The results were shown in Table 5.

TABLE 5

|  | Inhibitor (wt/%) | | | |
| --- | --- | --- | --- | --- |
|  | 0 | 0.5 | 1.0 | 1.5 |
| Methane hydrate induction period (min) | 146 | 987 | 1154 | 1302 |

Example 6

SHDH-2X hydrate (wax) multiphase flow loop experimental device, commercially available from Jiangsu Bohong Co. Ltd., was used to simulate the inhibiting effect of natural gas hydrate inhibitor in the actual pipeline transmission.

The experimental device mainly included six functional modules: a constant-flow liquid supply system (for injecting deionized water or inhibitor), a constant-pressure liquid supply system (for injecting methane gas), a multiphase flow pipeline system (including a gas-liquid atomizer, a viewing window and a multiphase flow pipeline, hydrates being generated in this system), a temperature control system, a pressure control system, a gas-liquid decomposition and separation system, and a data acquisition and control system.

1. Determination of the induction time of methane hydrate formation in a mixture of deionized water and methane gas in the absence of an inhibitor
    (1) First, deionized water was pumped into the multiphase flow pipeline system at a constant flow rate of 10 L/h through the constant-flow liquid supply system, so as to remove excess air from the multiphase flow pipeline system.

(2) The pressure of the multiphase flow pipeline system was controlled at 6 MPa through the pressure control system.

(3) A methane gas source was turned on to continuously inject the methane gas into the multiphase flow pipeline system at a pressure of 6.5 MPa through the constant-pressure liquid supply system.

(4) After passing through the gas-liquid atomizer, the methane gas and deionized water were mixed with the deionized water in the multiphase flow pipeline, thus forming a stable gas-liquid two-phase mixed flow.

(5) The temperature in the multiphase flow pipeline system was controlled to be 4° C. by the temperature control system. When the hydrated crystals were observed through the viewing window, i.e., the methane hydrate was formed in the circulating reaction pipeline, the time used was recorded, which was the induction time of methane hydrate formation.

2. Determination of the induction time of methane hydrate formation in a mixture of deionized water and methane gas in the presence of an inhibitor The inhibitor used was an aqueous solution of naphthenic imidazoline and cationic amylose with n ranging from 150 to 400, wherein a mass ratio of naphthenic imidazoline to cationic amylose was 1:1, and a total mass concentration of naphthenic imidazoline and cationic amylose was 0.5%.

(1) The same operation as in above 1 (1) was performed. Then the inhibitor was injected into the multiphase flow pipeline system through the constant-flow liquid supply system. (The mass of liquid injected into the multiphase flow pipeline per unit of time was 0.5%, the precise control of which was achieved through the rotational speed and power of the pressure pump.)

(2) When hydrated crystal was observed through the viewing window, i.e., the methane hydrate was formed in the multiphase flow pipeline, the time used was recorded, which was the induction time for methane hydrate formation. However, if the formation of hydrated crystal was not observed within 24 hours, 24 hours would be taken as the induction time for methane hydrate formation.

The results were shown in Table 6.

TABLE 6

| Components in the circulating pipeline | Induction time (min) |
| --- | --- |
| Deionized water + methane gas | 19 |
| Deionized water + methane gas + 0.5% of inhibitor | 1440 |

Although the present invention has been described in detail with reference to the above embodiments, it should be understood that one skilled in the art can make various modifications on these embodiments without departing from the spirit and scope of the present invention. Furthermore, various modifications can be made on the subject, spirit and scope of the present invention to adapt to specific situations, materials, material compositions and methods. All these modifications shall fall within the scope of the claims of the present invention.

The invention claimed is:

1. A method for inhibiting formation of natural gas hydrate, comprising adding a composition comprising naphthenic imidazoline into a gas mixture containing methane and water, wherein the naphthenic imidazoline is of formula (I):

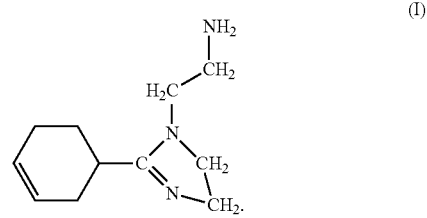 [SMILES: NCCN1CCN=C1C1CC=CCC1]

2. The method according to claim 1, wherein the natural gas hydrate is methane hydrate.

3. The method according to claim 1, wherein the composition further comprises a modified polysaccharide of formula (II),

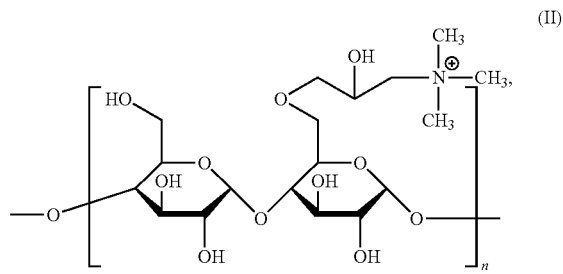

wherein n in formula (II) is from 150 to 400.

4. The method according to claim 3, wherein the composition has a mass ratio of the naphthenic imidazoline to the modified polysaccharide of 1:1 to 3:1.

5. The method according to claim 3, wherein the composition further comprises water.

6. The method according to claim 5, wherein a total mass percentage of the naphthenic imidazoline and the modified polysaccharide is from 0.5% to 1.5%, measured as 100% by a total mass of the composition.

7. The method according to claim 3, wherein the modified polysaccharide is obtained by modification of amylose in the presence of a cationic reagent.

8. The method according to claim 7, wherein the cationic reagent is epoxy propyl trimethyl ammonium chloride.

9. The method according to claim 7, wherein a mass ratio of amylose to the cationic reagent is 1:(1–2).

10. The method according to claim 3, wherein the natural gas hydrate is methane hydrate.

11. The method of claim 1, wherein the gas mixture is a natural gas stream in a pipeline.

* * * * *